April 16, 1935.  E. BIRD  1,997,807
VEHICLE BRAKE
Filed Feb. 27, 1933  2 Sheets-Sheet 1
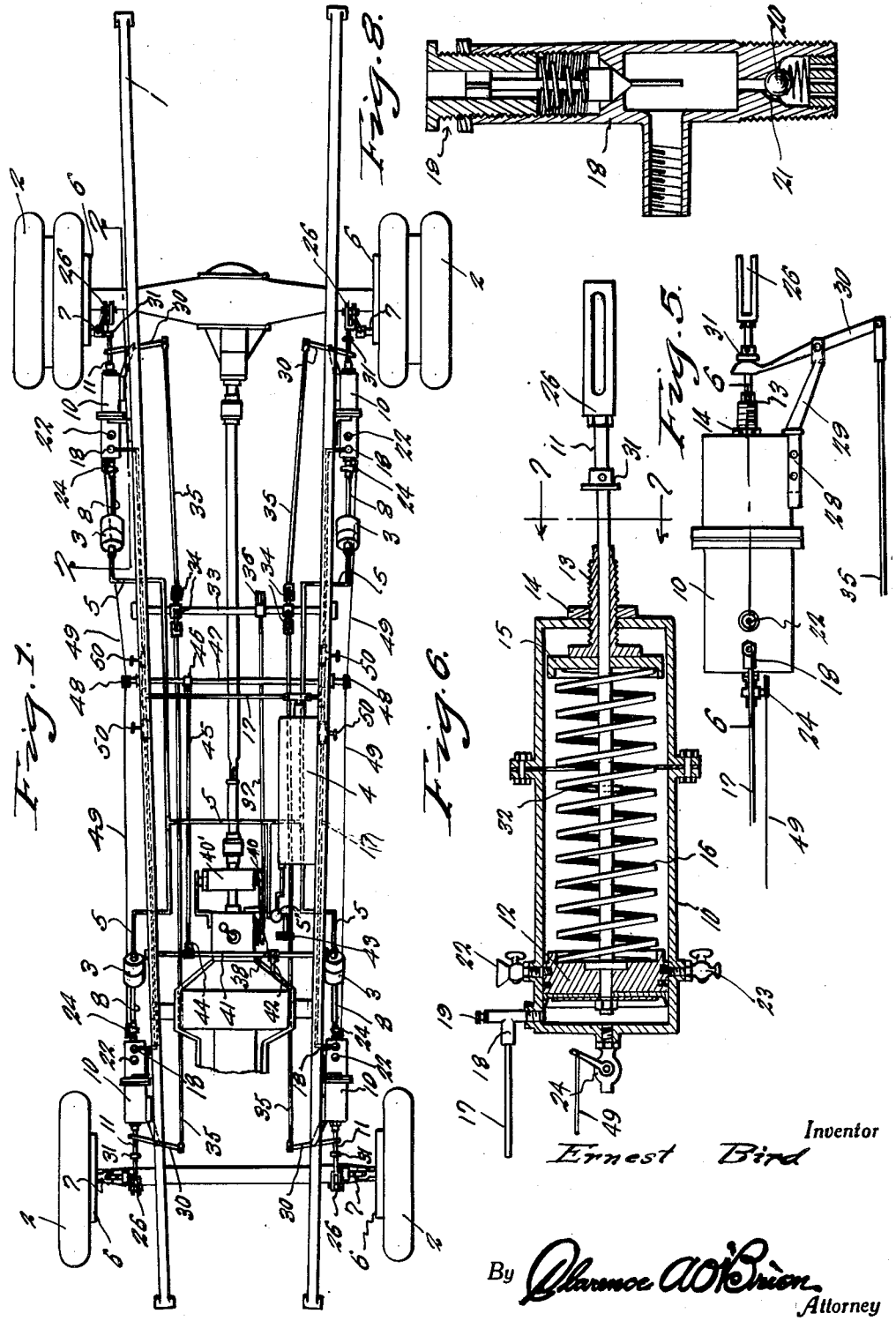
Inventor
Ernest Bird
By Clarence A. O'Brien
Attorney

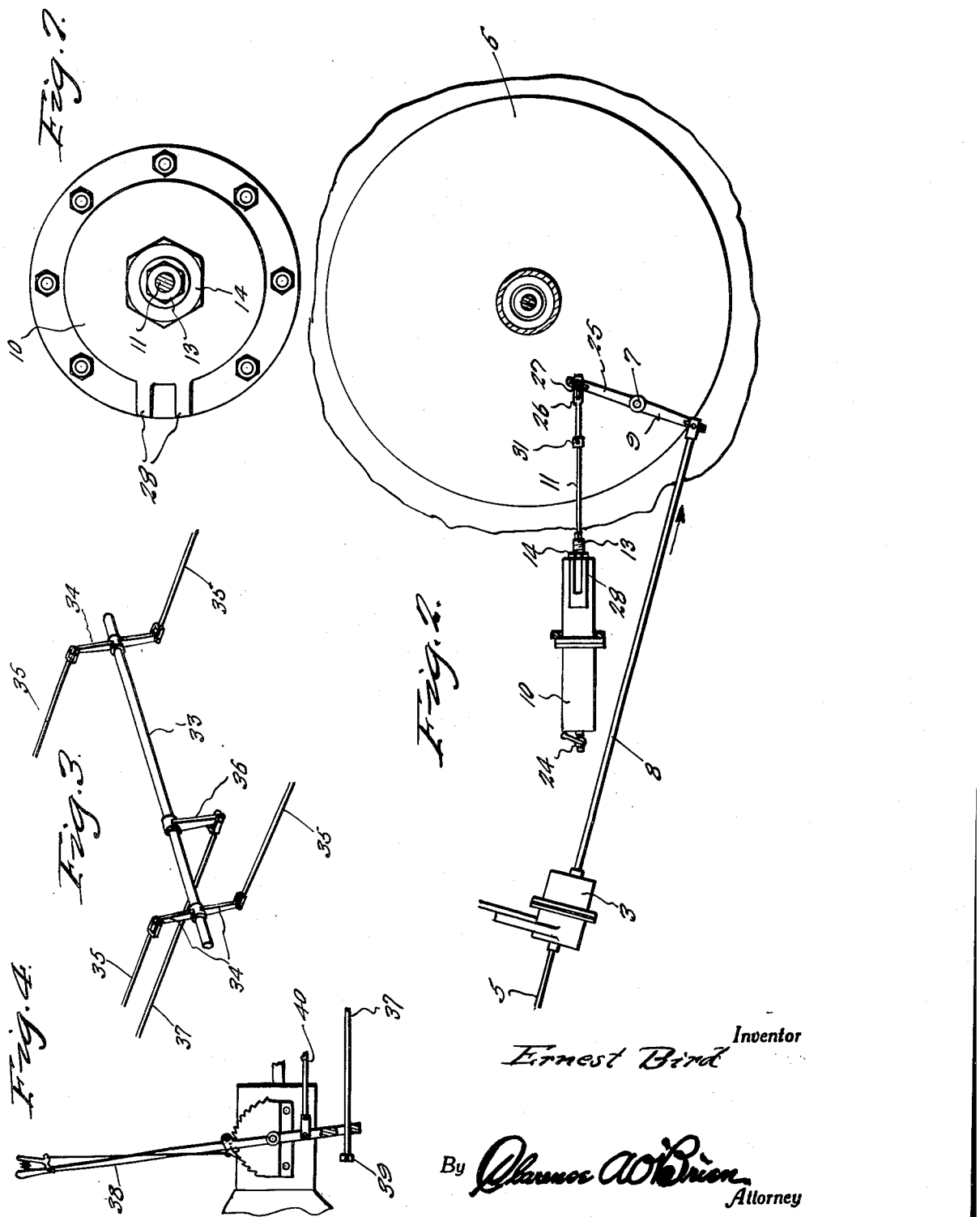

Patented Apr. 16, 1935

1,997,807

UNITED STATES PATENT OFFICE 1,997,807

VEHICLE BRAKE

Ernest Bird, Scranton, Pa., assignor of one-half to Lalli Stafforoni, Old Forge, Pa.

Application February 27, 1933, Serial No. 658,867

4 Claims. (Cl. 188—170)

The present invention relates to new and useful improvements in vehicle brakes of the fluid actuated type and has for its primary object to provide, in a manner as hereinafter set forth, a braking mechanism embodying a novel construction, combination and arrangement of parts through the medium of which the brakes of the vehicle will be automatically applied in case of failure of the fluid pressure.

Other objects of the invention are to provide a brake mechanism of the aforementioned character which will be simple in construction, strong, durable, highly efficient and reliable in operation, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in top plan, showing a braking apparatus in accordance with the present invention mounted on a vehicle.

Figure 2 is a view in vertical longitudinal section, taken substantially on the line 2—2 of Figure 1.

Figure 3 is a detail view in perspective of a portion of the releasing mechanism.

Figure 4 is a detail view, partially in vertical section, showing the means for connecting the releasing mechanism to the hand brake lever of the vehicle.

Figure 5 is a detail view in top plan of one of the cylinders and adjacent parts.

Figure 6 is a view in longitudinal section, taken substantially on the line 6—6 of Figure 5.

Figure 7 is a detail view in transverse section, taken substantially on the line 7—7 of Figure 6.

Figure 8 is a detail view in section through one of the T's which connects the fluid pressure pipes with the cylinders.

Referring now to the drawings in detail, it will be seen that the reference numeral 1 designates the chassis of an automobile which is mounted on the wheels 2. As usual, brake cylinders 3 are mounted on the chassis 1 adjacent the wheels 2, said cylinders 3 receiving fluid under pressure from a reservoir 4 through pipes 5. This tank or reservoir 4 preferably contains air supplied thereto by the usual compressor operated from the power plant of the vehicle and the flow of air from the reservoir to the cylinders 3 is controlled by a valve 5', operated by the pedal 43, as shown in Figure 1. The brakes 6 of the vehicle are actuated, as usual, by rock shafts 7 to which the pistons in the cylinders 3 are operatively connected by suitable means which may include push rods 8 and arms 9 which are fixed on the rock shafts 7 and to which the rods 8 are connected, as best seen in Figure 2 of the drawings. This system is well known and it is not thought necessary to describe it in detail.

The embodiment of the present invention which has been illustrated comprises cylinders 10 which are mounted on the chassis 1 adjacent the wheels 2. Extending slidably into the cylinders 10 through one end thereof are rods 11 having fixed thereon for reciprocation in said cylinders pistons 12. The rods 11 extend slidably through adjusting screws 13 which are threadedly mounted in the cylinders 10 and which are secured in adjusted position through the medium of lock nuts 14. Fixed on the inner ends of the adjusting screws 13 are substantially cup-shaped heads 15. Coil springs 16 encircle the rods 11 in the cylinders 10 and have one end engaged with the heads 15 and the other ends engaged with the pistons 12 for yieldingly urging said pistons toward brake applying position in the cylinders.

The ends of the cylinders 10 which are remote from the adjusting screws 13 are connected with the reservoir 4 for receiving fluid under pressure therefrom by pipes 17. The pipes 17 are connected to the cylinders 10 by T-couplings 18 having mounted therein safety valves which are designated generally by the reference numeral 19, as best seen in Figure 8 of the drawings. The safety valves 19 are, of course, adjustable. The T-couplings 18 are further provided with check valves 20, each of which includes a bleed-way 21. The cylinders 10 are further provided with oil cups 22 and drain valves 23. Extending from the ends of the cylinders 10 to which the pipes 17 are connected are fluid release valves 24 and these valves are normally held closed by the springs 24'.

Arms 25 are fixed on the rock shafts 7 of the vehicle brakes 6 and extend oppositely from the arms 9. Slotted yokes 26 are mounted on the piston rods 11 and are connected to the arms 25 by pin and slot connections 27, the slots in the yokes 26 permitting application of the vehicle brakes in the usual manner by the pistons in the cylinders 3 without interference by the pistons 12.

Spaced flanges 28 project laterally from one end portion of the cylinders 10 and secured between said flanges are brackets 29. Levers 30 are pivotally connected, at intermediate points, to the brackets 29 and have one end forked in a manner to straddle the piston rods 11 for engagement with collars 31 which are fixed on said piston rods. The collars 31 may, of course, be adjustable on the piston rods 11. Stop pins 32 (see Figure 6) are mounted transversely in the piston rods 11 in the cylinders 10 for engagement with the heads 15 for limiting the movement of the pistons 12 against the coil springs 16 under impulsion by the fluid from the reservoir 4.

Mounted transversely in the chassis 1 is a rock shaft 33 having fixed thereon oppositely extending arms 34. Rods 35 operatively connect the levers 30 to the arms 34. Also fixed on the rock shaft 33 is an arm 36 to which one end of a rod 37 is pivotally connected. The other end portion of the rod 37 is slidably engaged in an opening provided therefor in the lower portion of the hand brake lever 38 of the vehicle and has mounted thereon a stop 39. The reference numeral 40 designates the usual rod which connects the propeller shaft brake 40' of the vehicle to the lever 38. It will thus be seen that sufficient movement of the lever 38 to apply the hand brakes of the vehicle will be permitted without moving the rod 37 unless air has been released from the cylinders 10 to permit the springs 16 to operate the pistons 12, for when this takes place, the levers 30 move the rods 35 and the shaft 33 to positions where the rod 37 moves rearwardly to a position where its head 39 will be engaged by the lower end of the lever 38, when the lever is moved toward brake applying position. Thus when the lever is moved to a certain extent toward brake applying position, it will rock the shaft 33 through means of the rod 37 and this movement of the shaft 33 will operate the rods 35, which in turn operate the levers 30, which will move the pistons 12 against the action of the springs 16 so that the yokes 26 will release the wheel brakes. However, it is to be understood that this lever 38 is not moved to its full extent so that it will not apply the brake 40'.

The reference numeral 41 designates a rock shaft which is mounted transversely in the chassis 1 preferably adjacent the transmission of the vehicle. Fixed on the rock shaft 41 is an upstanding arm 44 to which one end of a rod 45 is pivotally connected. The other end of the rod 45 is pivotally connected to an upstanding arm 46 which is fixed on a rock shaft 47 journaled transversely in the chassis 1. Oppositely extending arms 48 are fixed on the end portions of the rock shaft 47 and have connected thereto cables 49 which are connected to the fluid release valves 24 of the cylinders 10 in a manner to open said valves 24 when the lever 42 is actuated in the proper direction.

It will thus be seen that the compressed air from the tank 4 is supplied to the cylinders 3 through the pipes 5 for operating the spring pressed pistons in said cylinders to cause the rods 8 to operate the wheel brakes through the arms 9 and shafts 7 and that the flow of air to said cylinders 3 is controlled by the valve 5' operated by the pedal 43. As before stated, this is conventional structure.

It will also be seen that the compressed air is supplied to the cylinders 10 from the tank 4 through the pipes 17 so that the pistons 12 are held in projected positions and against the action of the springs 16, with the yokes 26 in a position to permit application and release of the wheel brakes by the pistons in the cylinders 3. If anything should happen to the braking system to cause the air to leak therefrom, the air would also leak from the cylinders 10, through the bleed ports 21 so that the springs 16 would move the pistons 12 to positions where the yokes 26 would apply the wheel brakes. As before stated, this movement of the pistons under the action of the springs would move the levers 30, rods 35, shaft 33 and rod 37 so that the head 39 of the rod 37 would be in a position where it would be engaged by partial movement of the lever 38 to brake applying position and when the lever was so moved, the rod 37 would move forwardly, thus rocking the shaft 33 and exerting a pull upon the rods 35, thus causing the levers 30 to operate the rods 11 through means of the collars 31 to cause the yokes 26 to release the wheel brakes through means of the arms 25. Of course, this movement of the rods 11 will cause the pistons 12 to move against the action of the springs 32 so that as soon as the lever 38 is moved back to its releasing position, the springs 16 return the parts to their brake applying position. Thus when the braking system has been rendered inoperative through leakage of air, the lever 38 is used to release the wheel brakes, said brakes being applied by the springs 16. Attention is called to the fact that when the lever 38 is used for releasing the brakes of the wheels when such brakes have been applied by the springs 16, said lever must not be moved to the full limit of its rearward stroke, as this would apply the brake 40' through means of the rod 40, but said lever 38 is simply moved rearwardly to release the wheel brakes without applying the brake 40'. It will be understood that this lever 38, when used as above described, simply acts with the rest of my invention as an emergency braking system until the air system of the regular braking system can be repaired.

If the air system should fail for any reason and it is necessary to suddenly apply the wheel brakes, this can be done by rocking the shaft 41 through means of the lever or pedal 42 and when said shaft is rocked, a pull is exerted upon the rod 45, which rocks the shaft 47 and thus the cables 49 are caused to open the valves 24 so that the air will quickly escape from the cylinders 10 and permit the springs 16 to apply the wheel brakes.

Valves 50 are located in the pipes 17 leading to the cylinders 10 so that if any one of the cylinders 10 and their associated parts should be rendered inoperative for any reason, said cylinder can be cut out of the system by closing a valve 50 so that the other cylinders 10 and their associated parts can continue to operate.

What is claimed is:—

1. A vehicle brake comprising, in combination, a fluid pressure reservoir, cylinders mounted on the vehicle, pistons operable in the cylinders, means operatively connecting the pistons to the brakes of the vehicle, means yieldingly urging the pistons toward operative position, common means operatively connected to the pistons for manually actuating the pistons to inoperative position, means connecting the cylinders to the reservoir for receiving fluid under pressure therefrom for normally maintaining the pistons in inoperative position, valves connected to the cylinders for releasing the fluid from said cylinders, and common means operatively connected to the valves for manually opening said valves.

2. A vehicle brake comprising a cylinder, a fluid pressure reservoir, a piston operable in the cylinder, means operatively connecting the piston to a brake of the vehicle, a coil spring mounted in the cylinder and engaged with the piston for yieldingly urging said piston toward brake applying position, means for regulating the tension of the coil spring, means operatively connected with the piston for manually actuating said piston to inoperative position against the tension of the coil spring, means connecting the cylinder with the reservoir for receiving fluid under pressure therefrom for normally maintaining the piston in inoperative position against the tension of the coil spring, and means for releasing the fluid from the cylinder, the last named means including a valve connected to the cylinder, a rock shaft journaled on the vehicle, a cable connecting the valve to the rock shaft for actuation to open position thereby, another rock shaft journaled on the vehicle, an operating lever connected to the second named rock shaft, and means connecting the first named rock shaft to the second named rock shaft for actuation thereby.

3. In combination with a vehicle brake and fluid pressure means, manually controlled, for applying the brake, such means including a cylinder, a reservoir for the fluid under pressure and a conduit for connecting the reservoir with the cylinder, a second cylinder, a conduit connecting the same with the fluid system, a check valve in the conduit for holding pressure in the second cylinder, and a bleed port for permitting pressure to slowly escape from said second cylinder past the check valve, whereby a leak in the fluid system will drain the second cylinder to permit the spring to apply the brake, a piston in the second cylinder, means for connecting the piston with the brake, a spring for normally holding the piston in a position with the said brake applied, the piston being moved to brake releasing position by the fluid pressure, and manually operated means for moving the piston of the second cylinder to brake releasing position.

4. In combination with a vehicle brake and fluid pressure means, manually controlled, for applying the brake, such means including a cylinder, a reservoir for the fluid under pressure and a conduit for connecting the reservoir with the cylinder, a second cylinder, a conduit connecting the same with the fluid system, a piston in the second cylinder, a rod connected with the piston and passing through one end of the second cylinder, a yoke connected with the outer end of the rod and having an opening therein for receiving a part of the brake, whereby said brake can be operated by the fluid pressure means without interference by the yoke when the piston in the second cylinder is projected by the fluid pressure, a spring for normally holding the piston in a position with the said brake applied, the piston being moved to brake releasing position by the fluid pressure, means whereby a leak in the fluid system will drain the second cylinder to permit the spring to apply the brake, manually operated means for moving the piston of the second cylinder to brake releasing position, such means including a lever pivotally supported intermediate its ends and having an opening in one end through which the piston rod passes, the projections on the rod for moving the lever when the rod and piston are moved by the spring in the second cylinder, a rod connected with the other end of the latter, a manually operated member and means for connecting the rod to such member, and manually operated means for releasing the fluid in the second cylinder.

ERNEST BIRD.